United States Patent
Jang et al.

(10) Patent No.: US 10,160,649 B2
(45) Date of Patent: Dec. 25, 2018

(54) PROCESSES FOR SYNTHESIZING NANOCRYSTALS

(71) Applicant: SAMSUNG ELECTRONICS CO., LTD., Suwon-si, Gyeonggi-do (KR)

(72) Inventors: Hyo Sook Jang, Suwon-si (KR); Shin Ae Jun, Seongnam-si (KR); Eun Joo Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 14/909,235

(22) PCT Filed: Jul. 30, 2014

(86) PCT No.: PCT/KR2014/006998
§ 371 (c)(1),
(2) Date: Feb. 1, 2016

(87) PCT Pub. No.: WO2015/020349
PCT Pub. Date: Feb. 12, 2015

(65) Prior Publication Data
US 2016/0167965 A1     Jun. 16, 2016

(30) Foreign Application Priority Data
Aug. 5, 2013  (KR) .................. 10-2013-0092775

(51) Int. Cl.
| C09K 11/00 | (2006.01) |
| C09K 11/08 | (2006.01) |
| B82Y 20/00 | (2011.01) |
| B82Y 40/00 | (2011.01) |
| C01B 19/00 | (2006.01) |
| B82Y 30/00 | (2011.01) |

(52) U.S. Cl.
CPC ............ *C01B 19/007* (2013.01); *C09K 11/00* (2013.01); *C09K 11/08* (2013.01); *B82Y 20/00* (2013.01); *B82Y 30/00* (2013.01); *B82Y 40/00* (2013.01); *C01P 2002/72* (2013.01); *C01P 2004/64* (2013.01); *C01P 2006/40* (2013.01); *C09K 11/0805* (2013.01); *Y10S 977/774* (2013.01); *Y10S 977/896* (2013.01)

(58) Field of Classification Search
CPC ......... B82Y 20/00; B82Y 30/00; C09K 11/00; C09K 11/08; C09K 11/0805
See application file for complete search history.

(56) References Cited

U.S. PATENT DOCUMENTS

| 6,780,242 B2 | 8/2004 | Norris | |
| 7,056,471 B1 | 6/2006 | Han et al. | |
| 2006/0118757 A1* | 6/2006 | Klimov .................. | B82Y 15/00 252/62.51 R |
| 2006/0236918 A1 | 10/2006 | Jun et al. | |
| 2008/0029760 A1 | 2/2008 | Jun et al. | |
| 2009/0139574 A1* | 6/2009 | Pickett .................. | B82Y 30/00 136/265 |
| 2009/0230382 A1 | 9/2009 | Banin et al. | |
| 2009/0320916 A1 | 12/2009 | Yuan et al. | |
| 2010/0163798 A1 | 7/2010 | Ryowa et al. | |
| 2010/0316797 A1 | 12/2010 | Ying et al. | |
| 2011/0003144 A1 | 1/2011 | Brown et al. | |
| 2011/0008927 A1 | 1/2011 | Huang et al. | |
| 2011/0056564 A1 | 3/2011 | Korgel et al. | |
| 2011/0108115 A1 | 5/2011 | Deligianni et al. | |
| 2011/0108799 A1 | 5/2011 | Pickett et al. | |
| 2011/0212561 A1 | 9/2011 | Banin et al. | |
| 2011/0315954 A1 | 12/2011 | Jang et al. | |
| 2015/0159083 A1 | 6/2015 | Jun et al. | |

FOREIGN PATENT DOCUMENTS

| JP | 2012-1803 A | 1/2012 |
| JP | 4936338 B2 | 3/2012 |
| JP | 2012-219194 A | 11/2012 |
| KR | 10-0722086 B1 | 5/2007 |
| KR | 1020080044278 A | 5/2008 |
| KR | 1020080046158 A | 5/2008 |
| KR | 10-1028907 B1 | 4/2011 |
| KR | 1020110140049 A | 12/2011 |

OTHER PUBLICATIONS

Acharya et al., "An Alternate Route to High-Quality ZnSe and Mn-Doped ZnSe Nanorystals", The Journal of Physical Chemistry, vol. 1, 2010, pp. 485-488.

Chikan et al., "Synthesis of Highly Luminescent GaSe Nanoparticles", Nano Letters, vol. 2, No. 2, 2002, pp. 141-145.

Fitzmorris et al., "Synthesis and Structural, Optical, and Dynamic Properties of Core/Shell/Shell CdSe/ZnSe/ZnS Quantum Dots", The Journal of Physical Chemistry, vol. 116, 2012, pp. 25065-25073.

International Search Report for PCT/KR2014/006998 dated Dec. 15, 2014.

Kim et al., "Highly luminescing multi-shell semiconductor nanocrystals InP/ZnSe/ZnS", Applied Physics Letters, vol. 100, 2012, pp. 073107-1-073107-4.

Kim et al., "Reverse Type-I ZnSe/InP/ZnS Core/Shell/Shell Nanocrystals: Cadmium-Free Quantum Dots for Visible Luminescence", Small, vol. 7, No. 1, pp. 70-73.

Luong et al., "Green synthesis of highly UV-orange emitting ZnSe/ZnS:Mn/ZnS core/shell/shell nanocrystals by a three-step single flask method", RSC Advances, vol. 2, 2012, pp. 12132-12135.

(Continued)

*Primary Examiner* — Haidung D Nguyen
(74) *Attorney, Agent, or Firm* — Cantor Colburn LLP

(57) ABSTRACT

A process of synthesizing Ga—Se nanocrystals is provided, the process including:

contacting a first precursor containing gallium with a second precursor containing selenium to obtain a Ga—Se single precursor; and reacting the Ga—Se single precursor in a solvent in the presence of a ligand compound, and optionally with a third precursor including an element (A) other than gallium and selenium, to prepare a Ga—Se nanocrystal represented by Chemical Formula 1:

$$GaSe_xA_y \qquad \text{[Chemical Formula 1]}$$

wherein x is about 1.1 to 3, and y is about 0.1 to 4.

15 Claims, 5 Drawing Sheets

(56) References Cited

OTHER PUBLICATIONS

Mirafzal et al., "Singlet/Triplet Reversal in Strongly-Coupled GaSe Nanoparticle Aggregates", J. Phys. Chem., vol. 113. C, 2009, pp. 7139-7146.

Shao et al., "Aqueous synthesis of color-tunable and stable Mn2+-doped ZnSe quantum dots", Journal of Materials Chemistry, vol. 21. 2011, pp. 151-156.

Taniguchi et al., "The one-pot synthesis of core/shell/shell CdTe/CdSe/ZnSe quantum dots in aqueous media for in vivo deep tissue imaging", Journal of Materials Chemistry, vol. 21, 2011, pp. 2877-2882.

Weaver et al., "Photoluminescence Brightening via Electrochemical Trap Passivation in ZnSe and Mn2+-Doped ZnSe Quantum Dots", Journal of the American Chemical Society, vol. 134, 2012, pp. 6819-3825.

Zhang et al., "Enhancement of blue fluorescence on the ZnSe quantum dots doped with transition metal ions", Materials Letters, vol. 78, 2012, pp. 35-38.

Zheng et al., "Evidence of a ZnCr2Se4 Spinel Inclusion at the Core of a Cr-Doped ZnSe Quantum Dot", Journal of the American Chemical Society, vol. 134, 2012, pp. 5577-5585.

\* cited by examiner

[Figure 1]
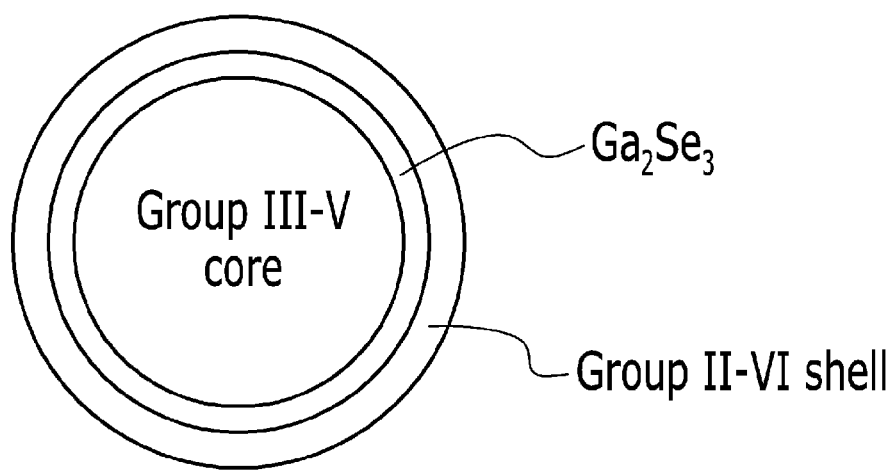

【Figure 2】
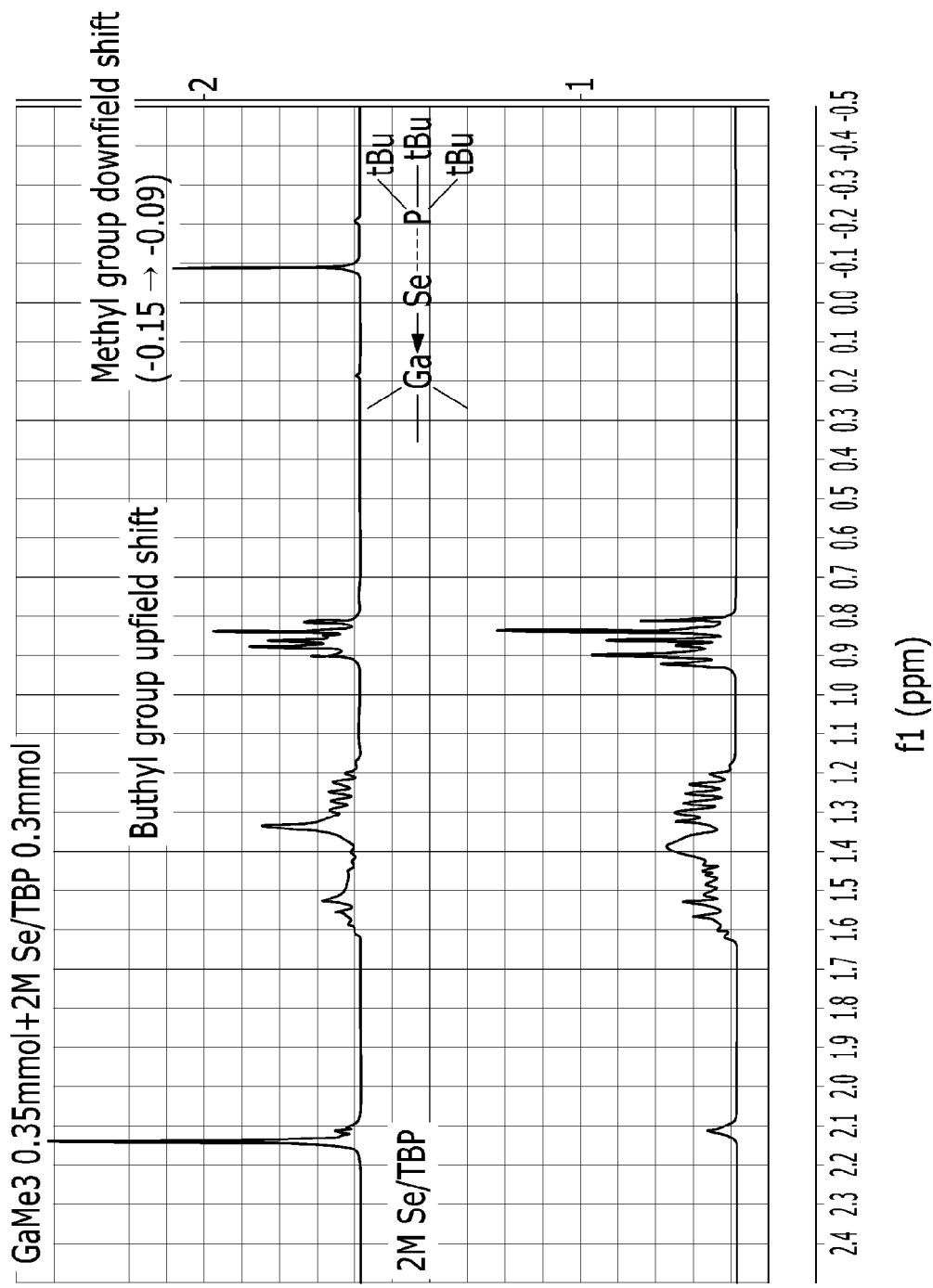

[Figure 3]
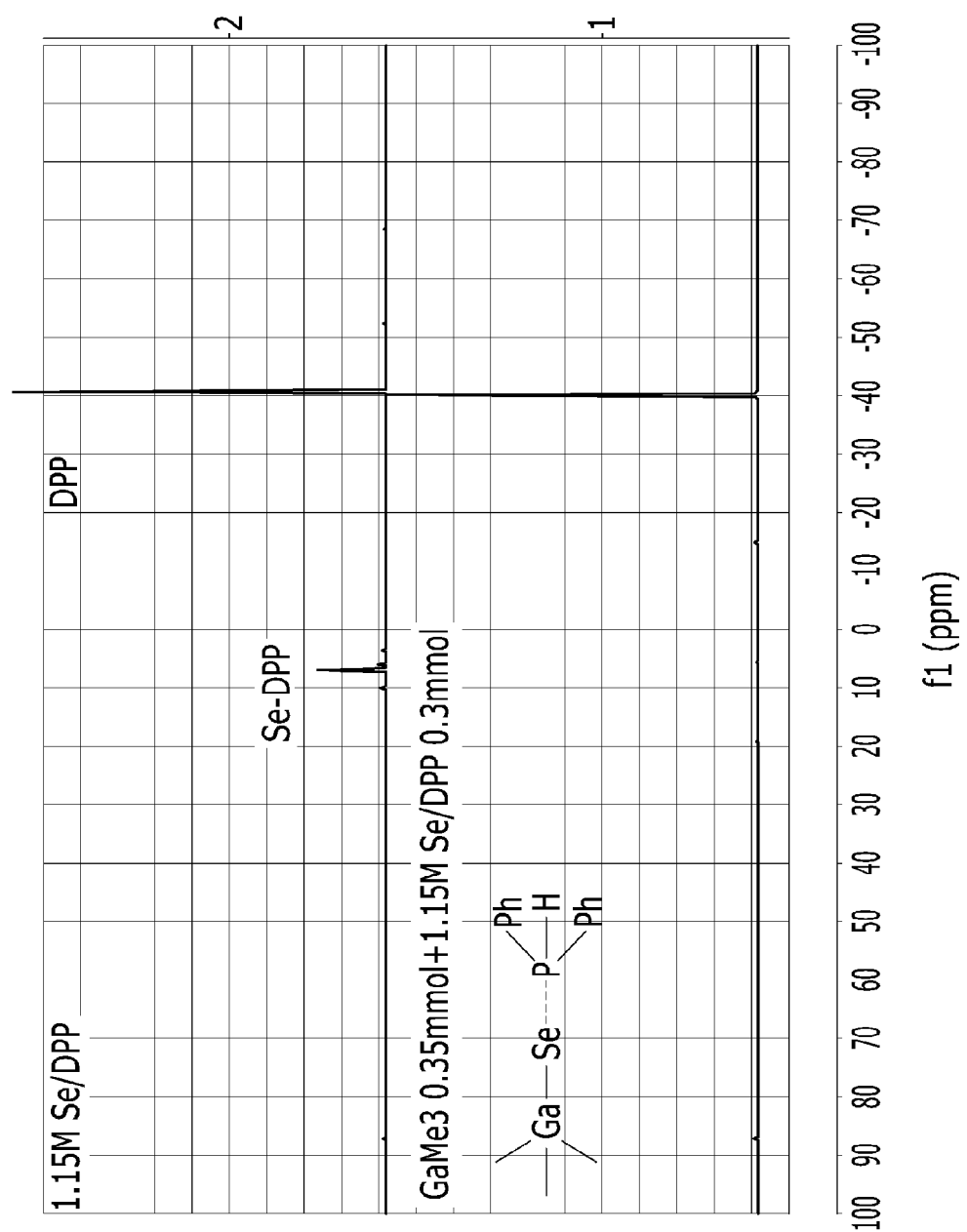

[Figure 4]
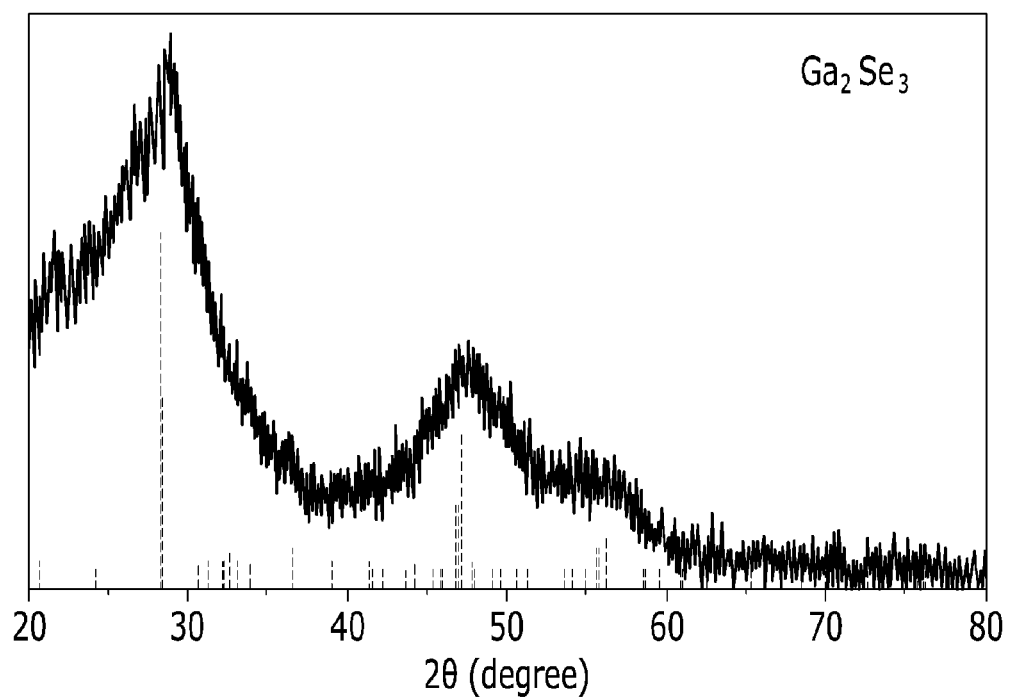

[Figure 5]
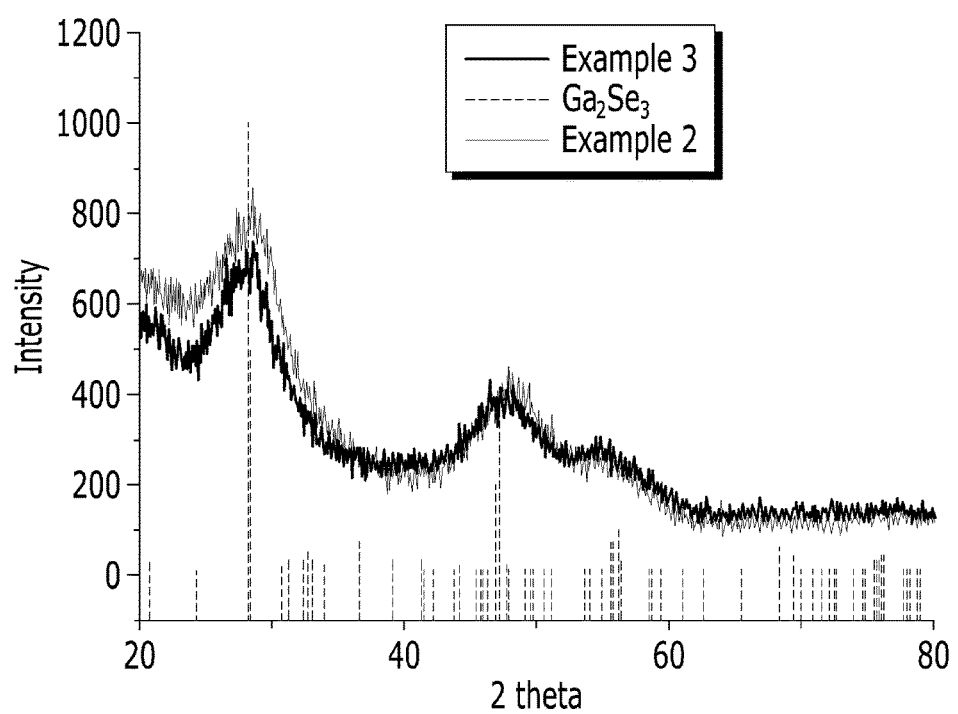

PROCESSES FOR SYNTHESIZING NANOCRYSTALS

TECHNICAL FIELD

This application is a U.S. national stage application of International Application No. PCT/KR2014/006998, filed on Jul. 30, 2014, and claims priority to and the benefit of Korean Patent Application No. 10-2013-0092775, filed on Aug. 5, 2013, and all the benefits accruing therefrom under 35 U.S.C. § 119, the contents of which are incorporated herein in their entirety by reference.

A process for synthesizing nanocrystals is disclosed.

BACKGROUND ART

Unlike bulk materials, nanoparticles may adjust their physical characteristics (e.g., energy bandgap and melting point) by changing their size. For example, a semiconductor nanocrystal (also known as a quantum dot) is a semiconductor material having a crystalline structure of a size of several nanometers. The semiconductor nanocrystal has a very small size so that it has a large surface area per unit volume and may exhibit a quantum confinement effect. Therefore, the semiconductor nanocrystal has different physicochemical characteristics from the bulk material. A quantum dot may absorb light from an excitation source to be in an excited state, and may emit energy corresponding to its energy bandgap. The energy bandgap of the quantum dot may be controlled by varying its size and/or the composition thereof. In addition, the quantum dot may emit light with high color purity. Therefore, various applications of the semiconductor nanocrystal in a display element, an energy device, a bio-light emitting element, or the like have been researched.

A semiconductor nanocrystal (i.e., a quantum dot) may be synthesized by a vapor deposition method such as metal organic chemical vapor deposition (MOCVD) and molecular beam epitaxy (MBE), or by a wet chemical method of adding a precursor to an organic solvent to grow crystals. In the wet chemical method, an organic material such as a dispersant coordinates a surface of the semiconductor crystal during the crystal growth to control the crystal growth. Therefore, the nanocrystals produced by the wet chemical method usually have a more uniform size and shape than those produced by the vapor deposition method.

Ga—Se semiconductor nanocrystals draw much attention as one of the base compositions for a copper-indium-gallium-selenide (CIGS) nanocrystal that is commonly used for photovoltaic cells, but little has been known about how to make to them. Moreover, it is known that the Ga—Se semiconductor nanocrystals are very difficult to synthesize via the wet chemical method. Thus, an urgent need to develop technologies to synthesize the Ga-se nanocrystal via the wet chemical method remains.

DISCLOSURE

Technical Problem

An embodiment is directed to a process for preparing various Ga—Se semiconductor nanocrystals via a wet chemical method.

Another embodiment is directed to nanoparticles including the Ga—Se semiconductor nanocrystal.

Technical Solution

According to an embodiment, a process of synthesizing Ga—Se nanocrystals is provided, the process including:

contacting a first precursor containing gallium with a second precursor containing selenium to obtain a Ga—Se single precursor; and reacting the Ga—Se single precursor in a solvent in the presence of a ligand compound, and optionally with a third precursor including an element (A) other than gallium and selenium, to prepare a Ga—Se nanocrystal represented by Chemical Formula 1:

$GaSe_xA_y$ [Chemical Formula 1]

wherein x is about 1.1 to 3, and y is about 0.1 to 4.

The element (A) other than gallium and selenium may be at least one selected from S, Te, N, P, As, Al, In, Zn, Cd, Mg, Mn, Cu, Ag, and Au.

In the Ga—Se nanocrystal, the atomic ratio (x) of Se with respect to Ga is at least about 1.2.

The first precursor may be a trialkyl gallium, gallium acetylacetonate, a gallium halide, a gallium oxide, a gallium alkoxide, or a combination thereof.

The second precursor may be a complex of selenium with a compound selected from a dialkylphosphine, a diarylphosphine, a trialkylphosphine, a trialkylphosphine oxide, and a combination thereof, a bis(trialkylsilyl)selenide, or a combination thereof.

The solvent may be selected from the group consisting of a C6 to C22 primary alkyl amine, a C6 to C22 secondary alkyl amine, C6 to C40 tertiary alkyl amine, a heterocyclic compound having a nitrogen atom, a C6 to C40 olefin, a C6 to C40 aliphatic hydrocarbon, an aromatic hydrocarbon substituted with a C6 to C30 alkyl group, a phosphine substituted with a C6 to C22 alkyl group, a phosphine oxide substituted with a C6 to C22 alkyl group, a C12 to C22 aromatic ether, or a combination thereof.

The ligand compound may be at least one selected from the group consisting of RCOOH, $RNH_2$, $R_2NH$, $R_3N$, RSH, $R_3PO$, $R_3P$, ROH, RCOOR', and RCOOCOR', wherein R and R' are each independently a C1 to C24 alkyl group, a C2 to C24 alkenyl group, or a C5 to C24 aryl group.

The reacting of the Ga—Se precursor may include reacting the Ga—Se precursor in the presence of a first nanocrystal to form a shell of the Ga—Se nanocrystal on the surface of the first nanocrystal.

The first nanocrystal may be a Group III-V semiconductor nanocrystal core or a core-shell type semiconductor nanocrystal having a Group III-V semiconductor to nanocrystal on the shell thereof.

Another embodiment provides a nanoparticle including a nanocrystal of a compound represented by Chemical Formula 1:

$GaSe_xA_y$ [Chemical Formula 1]

wherein x is about 1.1 to 3, y is about 0.1 to 4, and A is an element other than Ga and Se.

In the nanocrystal of the compound represented by Chemical Formula 1, the atomic ratio (x) of Se with respect to Ga is greater than or equal to about 1.2.

The nanoparticle may have a multishell structure, and the nanocrystal of the compound represented by Chemical Formula 1 may be present as an interlayer between a Group III-V semiconductor nanocrystal and a Group II-VI semiconductor nanocrystal.

The Group III-V semiconductor nanocrystal may include at least one compound selected from the group consisting of:
a binary element compound selected from GaN, GaP, GaAs, GaSb, AlN, AlP, AlAs, AlSb, InN, InP, InAs, InSb, and a combination thereof;

a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group II-VI compound may include at least one compound selected from: a binary element compound selected from CdSe, CdTe, ZnS, ZnSe, ZnTe, to ZnO, HgS, HgSe, HgTe, MgSe, MgS, and a combination thereof;

a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The nanocrystal of the compound represented by Chemical Formula 1 may have a zinc blend crystalline structure.

Advantageous Effects

In accordance with the aforementioned methods of synthesizing a nanocrystal, a nanoparticle including a Ga—Se nanocrystal having various compositions may be easily prepared. The Se-rich Ga—Se nanocrystal has a zinc blend crystalline structure so that it may be used as an interlayer between a zinc blend core and a shell of another crystalline structure. In addition, Ga having a valence of +3 and Se having a valence of −2 may contribute to the realization of charge balancing between the layers included in a multishell nanocrystal.

DESCRIPTION OF DRAWINGS

These and/or other aspects will become apparent and more readily appreciated from the following description of the embodiments, taken in conjunction with the accompanying drawings, in which:

FIG. 1 is a view schematically illustrating a nanocrystal particle of a multishell to structure in accordance with an embodiment;

FIG. 2 shows an H NMR result of a Ga—Se single precursor obtained by mixing trimethyl gallium and Se/TBP.

FIG. 3 shows a P NMR result of a Ga—Se single precursor obtained by mixing trimethyl gallium and Se/DPP.

FIG. 4 shows an X-ray diffraction spectrum of the $Ga_2Se_3$ nanocrystal synthesized in Example 1.

FIG. 5 shows X-ray diffraction spectrums of the $Ga_2Se_3$ nanocrystals synthesized in Example 2 and Example 3.

BEST MODE

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well known technologies are not specifically explained to avoid ambiguous understanding of the present invention.

Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or."

A process of synthesizing nanocrystals according to an embodiment includes:

contacting a first precursor containing gallium with a second precursor containing selenium to obtain a Ga—Se single precursor; and reacting the Ga—Se single precursor in a solvent in the presence of a ligand compound, and optionally with a third precursor including an element (A) other than gallium and selenium, to prepare a Ga—Se nanocrystal represented by Chemical Formula 1:

      [Chemical Formula 1]

wherein x is about 1.1 to 3, for example about 1.2 to 2.5, and y is about 0.1 to 4.

The element (A) other than gallium and selenium may be S, Te, N, P, As, Al, In, Zn, Cd, Mg, Mn, Cu, Ag, Au, or a combination thereof.

In the aforementioned method, the first precursor containing gallium and the second precursor containing selenium may be mixed prior to being introduced into a reaction system to generate a weak interaction of a bond between the Ga atoms and the Se atoms, and the product therefrom is used as a single precursor, and thereby it becomes easier to control the ratio between the gallium atoms and the selenium atoms in the Ga—Se nanocrystal. The first precursor may be a trialkyl gallium such as trimethyl gallium and triethyl gallium; gallium acetylacetonate; a gallium halide such as gallium chloride and gallium iodide; a gallium oxide; a gallium alkoxide such as gallium ethoxide and gallium isopropoxide; or a combination thereof. The second precursor may be a complex of selenium with a compound selected from a dialkylphosphine, a diarylphosphine, a trialkylphosphine, a trialkylphosphine oxide, and a combination thereof, a bis(trialkylsilyl)selenide, or a combination thereof. For example, the second precursor may be selenium-diphenylphosphine (DPP), to selenium-trioctylphosphine (Se-TOP), selenium-tributylphosphine (Se-TBP), selenium-triphenylphosphine (Se-TPP), bis(trimethyl silyl)selenide, bis(triethyl silyl)selenide, or a combination thereof.

When the gallium precursor and the selenium precursor do not form a single precursor but they are introduced separately into a reaction system to perform a reaction, it is very difficult for the resulting nanocrystal to have a desired ratio between the gallium atoms and the selenium atoms. In contrast, in the aforementioned method, the Ga—Se single crystal is first formed and then subjected to a reaction, and thereby it becomes possible to obtain a Ga—Se nanocrystal having a desired ratio between the gallium atoms and the selenium atoms by controlling reaction conditions such as the ligand, the solvent, the reaction temperature, and the like. Contacting the first precursor containing gallium with the second precursor containing selenium may be accomplished by mixing the two precursors. The contacting may be conducted under an inert atmosphere (e.g., in a glove box), for example, at room temperature.

The Ga—Se single precursor may be subjected to a reaction in a solvent in the presence of a ligand compound and optionally with a third precursor including an element (A) other than gallium and selenium, to form a nanocrystal of a compound represented by Chemical Formula 1:

$$GaSe_xA_y \quad \text{[Chemical Formula 1]}$$

wherein x, y, and A are the same as defined above.

In the Ga—Se nanocrystal, the ratio between Ga and Se may be adjusted by controlling the types and the amount of the gallium precursor and the selenium precursor used in the single precursor, the types of the ligand compound in the to reaction system, the types of the solvent, and the like. In an embodiment, the nanocrystal of the compound represented by Chemical Formula 1 may be a compound represented by Chemical Formula 1-1:

$$GaSe_x \quad \text{[Chemical Formula 1-1]}$$

wherein x is the same as defined above.

In a non-limiting example, the Ga—Se nanocrystal thus prepared may be a $Ga_2Se_3$ nanocrystal. In a non-limiting example, the Ga—Se nanocrystal thus prepared may have a zinc blend structure, which may be identified by an X-ray diffraction spectrum of the nanocrystal thus prepared.

The solvent may be an organic solvent. The solvent may include a C6 to C22 primary alkyl amine such as hexadecylamine, a C6 to C22 secondary alkyl amine such as dioctylamine, a C6 to C40 tertiary alkyl amine such as trioctylamine, a heterocyclic compound having a nitrogen atom such as pyridine, a C6 to C40 olefin such as octadecene, a C6 to C40 aliphatic hydrocarbon such as hexadecane, octadecane, and squalene, an aromatic hydrocarbon substituted with a C6 to C30 alkyl group such as phenyldodecane, phenyltetradecane, and phenyl hexadecane, a phosphine substituted with a C6 to C22 alkyl group such as trioctylphosphine, a phosphine oxide substituted with a C6 to C22 alkyl group such as trioctylphosphine oxide, a C12 to C22 aromatic ether such as phenyl ether and benzyl ether, or a combination thereof.

The ligand compound is coordinated to the surface of the nanocrystals as prepared, playing a role of well-dispersing the nanocrystals in a solution, and may have an effect on the light-emitting and electrical characteristics of the nanocrystals. The ligand compound may be at least one selected from the group consisting of to RCOOH, $RNH_2$, $R_2NH$, $R_3N$, RSH, $R_3PO$, $R_3P$, ROH, RCOOR', and RCOOCOR', wherein R and R' are each independently a C1 to C24 alkyl group, a C2 to C24 alkenyl group, or a C5 to C24 aryl group. The ligand compound may be used alone or in a mixture of at least two compounds. The ligand compound may be separately introduced in the reaction system. In an example, the phosphine compound of the Se precursor or a coordinating organic solvent may further act as a ligand compound in the reaction system.

Examples of the organic ligand compound may include, but are not limited to, methanethiol, ethanethiol, propanethiol, butanethiol, pentanethiol, hexanethiol, octanethiol, dodecanethiol, hexadecanethiol, octadecanethiol, benzylthiol, methylamine, ethylamine, propylamine, butylamine, pentylamine, hexylamine, octylamine, dodecylamine, hexadecylamine, octadecylamine, oleylamine, dimethylamine, diethylamine, dipropylamine, methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, palmitic acid, stearic acid, a phosphine such as methylphosphine, ethylphosphine, propylphosphine, butylphosphine, pentylphosphine, tributylphosphine, trioctylphosphine, and the like, a phosphine compound or an oxide compound thereof such as methylphosphine oxide, ethylphosphine oxide, propylphosphine oxide, butylphosphine oxide, trioctylphosphine oxide, and the like, a diphenylphosphine compound, a triphenylphosphine compound, or an oxide compound thereof, and the like, and a phosphonic acid. The organic ligand compound may be used alone or as a mixture of two or more compounds.

The reaction conditions such as a reaction temperature and a reaction time are not particularly limited, but may be chosen appropriately. In a non-limiting to example, a solvent and optionally a ligand compound may be heated under vacuum to a predetermined temperature (e.g., about 100° C. or higher). After the atmosphere is changed into an inert gas atmosphere, they may be heated to a reaction temperature (e.g., 100° C. or higher). The Ga—Se single crystal prepared in the aforementioned method is added to the heated reaction system, and optionally an additional nanocrystal (e.g., a first nanocrystal) and/or a third precursor may be added thereto, and the reaction proceeds.

According to the method set forth above, it is possible to obtain a Ga—Se nanocrystal of a predetermined composition (for example, a $Ga_2Se_3$ nanocrystal). As used herein, the term "$Ga_2Se_3$ nanocrystal" may refer to a nanocrystal having a ratio between Ga and Se (Ga:Se) of 1:1.1 or higher, for example, 1:1.2 or higher. In an embodiment, the Ga—Se nanocrystal may have a zinc blend crystalline structure. Using such a $Ga_2Se_3$ nanocrystal as an interlayer in a multishell structured nanocrystal makes it possible to achieve charge balance between a Group III-V semiconductor nanocrystal (e.g. a core) and a Group II-VI semiconductor nanocrystal (e.g., a shell).

The types and structure of the first nanocrystal may be chosen appropriately. In an embodiment, the first nanocrystal may be a semiconductor core or a core-shell type of nanocrystal. The first nanocrystal may include at least one compound selected from the group consisting of Group II-VI compounds, Group III-V compounds, and Group IV- VI compounds. The Group III-V compounds may further include a Group II metal if desired.

The Group II-VI compound may be selected from: a binary element compound selected from CdSe, CdTe, ZnS, ZnSe, ZnTe, ZnO, HgS, HgSe, HgTe, MgSe, MgS, and a combination thereof; a ternary element compound selected from CdSeS, to CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound semiconductor may be selected from: a binary element compound selected from GaN, GaP, GaAs, GaSb, AlN, AlP, AlAs, AlSb, InN, InP, InAs, InSb, and a combination thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from: a binary element compound selected from SnS, SnSe, SnTe, PbS, PbSe, PbTe, and a combination thereof; a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

The semiconductor nanocrystal may include at least two kinds of compounds. The binary element compound, the ternary element compound, or the quaternary element compound may be present in a form of an alloy, or in a form of a structure wherein at least two different crystalline structures coexist as layers such as a core/shell or as compartments such as multi-pods. When the first nanocrystal has a core-shell structure, a nanocrystal having a core-multishell structure may be prepared.

The third precursor may include a metal selected from a Group II metal, a Group III metal other than Ga, a Group 11 metal, and a Group IV metal. The third precursor may include a Group V non-metal element or a Group VI non-metal element other than Se. The types of the third precursor are not particularly limited but may be selected as necessary. In non-limiting examples, the third precursor containing a metal element may include a Group II metal, a Group III metal, or a Group IV metal, and may be a metal powder, an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof. Examples of the metal precursor may be at least one selected from dimethyl zinc, diethyl zinc, zinc acetate, zinc acetylacetonate, zinc iodide, zinc bromide, zinc chloride, zinc fluoride, zinc carbonate, zinc cyanide, zinc nitrate, a zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bis(acetylacetonate), tin bromide, tin chloride, tin fluoride, tin oxide, tin sulfate, germanium tetrachloride, germanium oxide, germanium ethoxide, trimethyl gallium, triethyl gallium, gallium acetylacetonate, gallium-3-chloride, gallium fluoride, gallium oxide, gallium nitrate, gallium sulfate, trimethyl indium, indium acetate, indium hydroxide, indium chloride, indium oxide, indium nitrate, indium sulfate, thallium to acetate, thallium acetylacetonate, thallium chloride, thallium oxide, thallium ethoxide, thallium nitrate, thallium sulfate, thallium carbonate, dimethyl magnesium, dibutyl magnesium, magnesium ethoxide, magnesium acetylacetonate, magnesium carboxylate, and magnesium halide, but it is not limited thereto.

The third precursor containing a non-metal element may be at least one selected from hexanethiol, octanethiol, decanethiol, dodecanethiol, hexadecanethiol, mercaptopropylsilane, sulfur-trioctylphosphine (S-TOP), sulfur-tributylphosphine (S-TBP), sulfur-triphenylphosphine (S-TPP), sulfur-trioctylamine (S-TOA), trimethylsilyl sulfur, ammonium sulfide, sodium sulfide, tellurium-tributylphosphine (Te-TBP), tellurium-triphenylphosphine (Te-TPP), tris(trimethylsilyl)phosphine, tris(dimethylamino)phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, tris(trimethylsilyl)arsenic, nitric oxide, nitric acid, and ammonium nitrate.

In another embodiment, a nanoparticle includes a nanocrystal of a compound represented by Chemical Formula 1:

GaSe$_x$A$_y$     [Chemical Formula 1]

wherein x is about 1.1 to 3, y is about 0.1 to 4, A is an element other than Ga and Se.

The element (A) other than gallium and selenium may be at least one selected from S, Te, N, P, As, Al, In, Zn, Cd, Mg, Mn, Cu, Ag, and Au.

The nanocrystal of the compound represented by Chemical Formula 1 may be Ga$_2$Se$_3$. GaSe, which is a type of the Ga—Se nanocrystal, may have an indirect bandgap of 2.11 eV and a four layer structure of Se—Ga—Ga—Se (i.e., a layered to structure), which is unfavorable for shelling. Unlike GaSe, the Ga$_2$Se$_3$ nanocrystal may exhibit a bandgap of 1.92 eV and has a zinc blend structure as identified in its XRD spectrum. However, the bandgap value may vary with the measuring conditions, the material state (e.g., film, crystalline, and the like), and the like. The value of 1.92 eV is a value for a bulk single crystal. Accordingly the Ga$_2$Se$_3$ nanocrystal may be useful as an interlayer in the quantum dot multishell structure. When the nanoparticle has a multishell structure, the nanocrystal of the compound represented by Chemical Formula 1 may be present as an interlayer between a core of the Group III-V semiconductor nanocrystal having a zinc blend structure and a shell of the Group II-VI semiconductor nanocrystal. Such a structure has an advantage in that the nanocrystal interlayer of the compound represented by Chemical Formula 1 may play a role of balancing the charge difference between the Group III-V core and the Group II-VI shell.

Examples of the Group III-V semiconductor nanocrystal may include the Group III-V compounds as set forth above.

Examples of the Group II-VI semiconductor nanocrystal may include the Group II-VI compounds as set forth above.

The Ga—Se nanocrystal may have a particle diameter (the longest diameter in case of a non-spherical particle) ranging from about 1 nm to about 100 nm, for example about 1 nm to about 20 nm.

The Ga—Se nanocrystals may find their utility in various fields such as a light emitting diode ("LED"), a solar cell, and a biosensor.

Hereinafter, the present invention is illustrated in more detail with reference to specific examples. However, they are exemplary embodiments of the present invention, and the present invention is not limited thereto.

Mode for Invention

EXAMPLES

Reference Example

Formation of Single Precursor 0.35 mmol of trimethyl gallium (TMG) is mixed with 0.3 mmol of 2 M Se/TBP, and the resulting mixture is subjected to H NMR analysis, the results of which are shown in FIG. 2. 0.35 mmol of trimethyl gallium is mixed with 0.3 mmol of 1.15 M Se/DPP, and the resulting mixture is subjected to P NMR analysis, the results of which are shown in FIG. 3. The results of the P NMR analysis show that Se/DPP has two peaks, one being assigned to DPP, the other being assigned to Se-DPP. After TMG is added, the peak for Se-DPP disappears. Such results confirm that Ga—Se bonding is generated and the Se-DPP bonding is broken. The H NMR results of the mixture of Se/TBP and TMG show that the methyl peak of TMG is shifted from −0.15 ppm to −0.09 ppm and the coupling pattern of tert-butyl moiety of TBP exhibits an upfield shift, confirming the formation of Ga—Se bonding.

Example 1

Synthesis of a $Ga_2Se_3$ Nanocrystal I 10 mL of trioctylphosphine (TOP) is put into a flask purged by $N_2$ and is heated to 120° C. The atmosphere of the flask is changed by $N_2$ and the flask is heated to 280° C. 0.7 mmol of trimethyl gallium (TMG) and 0.6 mmol of Se/diphenylphosphine (DPP) are mixed well in a glove box and the resulting mixture is quickly injected into the flask. Then the reaction proceeds for 30 minutes, and the reaction mixture is cooled to room temperature and chloroform and methanol are added thereto to precipitate nanocrystals which are then separated by centrifugation. The nanocrystals thus obtained are subjected to inductively coupled plasma analysis, and to the results confirm that the ratio between Ga and Se is 1:1.23 (Ga:Se). The X-ray diffraction spectrum of the nanocrystals thus obtained is shown in FIG. 4.

Example 2

Synthesis of a $Ga_2Se_3$ Nanocrystal II 10 mL of trioctylphosphine oxide (TOPO) is put into a flask purged by $N_2$ and is heated to 120° C. for 10 minutes. The atmosphere of the flask is changed by $N_2$ and 10 mL of trioctylphosphine is added thereto and is heated to 280° C. under the $N_2$ atmosphere. 0.7 mmol of trimethyl gallium (TMG) and 0.6 mmol of Se/diphenylphosphine (DPP) are mixed well in a glove box and the resulting mixture is quickly injected into the flask at 280° C. Then the reaction proceeds for 30 minutes, the reaction mixture is cooled to room temperature, and chloroform and methanol are added thereto to precipitate nanocrystals, which are then separated by centrifugation. The nanocrystals thus obtained are subjected to inductively coupled plasma analysis, and the results confirm that the ratio between Ga and Se is 1:1.36 (Ga:Se). The X-ray diffraction spectrum of the nanocrystals thus obtained is shown in FIG. 5.

Example 3

Nanocrystals are prepared in the same manner as set forth in Example 2, except for using 0.35 mmol of trimethyl gallium (TMG) and 0.3 mmol of Se/diphenylphosphine (DPP). The nanocrystals thus obtained are subjected to inductively coupled plasma analysis, and the results confirm that the ratio between Ga and Se is 1:1.29 (Ga:Se). The X-ray diffraction spectrum of the nanocrystals thus to obtained is shown in FIG. 5.

Example 4

Synthesis of an $InZnP/Ga_2Se_3/ZnSe/ZnS$ Nanocrystal 10 mL of octadecene (ODE) is put into a flask purged by $N_2$ and is heated to 120° C. under vacuum. The atmosphere of the flask is changed by $N_2$ and is heated again to 280° C. 0.35 mmol of trimethyl gallium (TMG) and 0.3 mmol of Se/diphenylphosphine (DPP) are mixed well in a glove box and the resulting mixture is quickly injected into the flask at 280° C. After 15 minutes, InZnP (optical density: 0.15) is injected quickly and the reaction proceeds for 75 minutes. Then, 0.15 mmol of $Zn(OA)_2$-TOP is added dropwise to the reaction mixture thus obtained, and 0.3 mmol of 0.4M S/TOP is added dropwise thereto. The reaction then proceeds for 3 hours and 15 minutes. The resulting reaction mixture is cooled to room temperature, and chloroform and methanol are added thereto to precipitate nanocrystals, which are then separated by centrifugation. The nanocrystals thus obtained are subjected to inductively coupled plasma analysis and the results are shown in Table 1.

TABLE 1

| Sample | In | P | Ga | Se | Zn | S |
|---|---|---|---|---|---|---|
| Example 5 | 1.00 | 1.06 | 0.79 | 1.80 | 0.62 | 0.12 |

The results of Table 1 confirm that a multishell structured nanocrystal is prepared with a $Ge_2Se_3$ nanocrystal as an interlayer.

Comparative Example 15 gram of trioctylphosphine oxide (TOPO) is put into a flask purged by $N_2$ and is heated to 120° C. for 10 minutes. The atmosphere of the flask is changed by $N_2$ and 5 mL of trioctylphosphine is added thereto and is heated to 120° C. under a $N_2$ atmosphere. In a glove box, 20 mmol of 1.6 M Se/ diphenylphosphine (DPP) is injected into the flask, and the temperature is raised to 278° C. 8 mmol of trimethyl gallium ($GaMe_3$) and 7.5 mL of TOP are injected quickly into the flask and the reaction proceeds at 266° C. for 2 hours. The reaction mixture is cooled to room temperature, and chloroform and methanol are added thereto to precipitate nanocrystals, which are then separated by centrifugation. The nanocrystals thus obtained are subjected to inductively coupled plasma analysis, and the results confirm that the ratio between Ga and Se is 1:0.99 (Ga:Se). The electron diffraction pattern of the nanocrystals confirm that they have a two dimensional tetra-layered structure.

Example 5

Synthesis of a GaSeZn Nanocrystal II 10 mL of trioctylphosphine (TOP) is put into a flask purged by $N_2$ and is heated to 120° C. The atmosphere of the flask is changed by $N_2$ and the flask is heated again to 280° C. 0.7 mmol of trimethyl gallium (TMG) and 0.6 mmol of Se/diphenylphosphine (DPP) are mixed well in a glove box and the resulting mixture is quickly injected into the flask at 280° C. After 20 minutes, a mixture of 0.1 mmol of diethyl zinc and 1 mL of TOP is injected into the flask. Then the reaction proceeds for 30 minutes, and the reaction mixture is cooled to room temperature and chloroform and methanol are added thereto to precipitate nanocrystals represented by $GaSe_xZn_y$, to (wherein x is 1.1 to 3, and y is 0.1 to 4), which are then separated by centrifugation.

Example 6

Synthesis of a GaSeMg Nanocrystal II 10 mL of trioctylphosphine (TOP) is put into a flask purged by $N_2$ and is heated to 120° C. The atmosphere of the flask is changed by $N_2$ and the flask is heated again to 280° C. 0.7 mmol of trimethyl gallium (TMG) and 0.6 mmol of Se/diphenylphosphine (DPP) are mixed well in a glove box and the resulting mixture is quickly injected into the flask. After 20 minutes, a mixture of 0.1 mmol of dimethyl magnesium and 1 mL of TOP is injected to the flask. Then the reaction proceeds for 30 minutes, and the reaction mixture is cooled to room temperature and chloroform and methanol are added thereto to precipitate nanocrystals represented by $GaSe_xMg_y$ (wherein x is 1.1 to 3, and y is 0.1 to 4), which are then separated by centrifugation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A nanoparticle including a nanocrystal of a compound represented by Chemical Formula 1 or Chemical Formula 1-1:

$GaSe_xA_y$ [Chemical Formula 1]

$GaSe_x$ [Chemical Formula 1-1]

wherein x is about 1.1 to 3, y is about 0.1 to 4, and A is S, Te, N, P, As, Al, In, Zn, Cd, Mg, Mn, Ag, Au, or a combination thereof,
wherein the nanoparticle has a multishell structure, and wherein the nanocrystal of the compound represented by Chemical Formula 1 or Chemical Formula 1-1 is present as an interlayer between a Group III-V semiconductor nanocrystal and a Group II-VI semiconductor nanocrystal.

2. The nanoparticle of claim 1, wherein the nanocrystal of the compound represented by Chemical Formula 1 has an atomic ratio of Se with respect to Ga of at least about 1.2.

3. The nanoparticle of claim 1, wherein the Group III-V semiconductor nanocrystal comprises:
   a binary element compound,
   a ternary element compound,
   a quaternary element compound, or a combination thereof.

4. The nanoparticle of claim 1, wherein the Group II-VI compound comprises
   a binary element compound,
   a ternary element compound,
   a quaternary element compound, or a combination thereof.

5. The nanoparticle of claim 1, wherein the nanocrystal of the compound represented by Chemical Formula 1 has a zinc blend crystal structure.

6. The nanoparticle of claim 3, wherein
   the binary element compound comprises GaN, GaP, GaAs, GaSb, AlN, AlP, AlAs, AlSb, InN, InP, InAs, InSb, or a combination thereof,
   the ternary element compound comprises GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof, and
   the quaternary element compound comprises GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof.

7. The nanoparticle of claim 4, wherein
   the binary element compound comprises CdSe, CdTe, ZnS, ZnSe, ZnTe, ZnO, HgS, HgSe, HgTe, MgSe, MgS, or a combination thereof,
   the ternary element compound comprises CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof, and
   a quaternary element compound comprises HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof.

8. A nanoparticle including a nanocrystal of a compound represented by Chemical Formula 1 or Chemical Formula 1-1:

$GaSe_xA_y$ [Chemical Formula 1]

$GaSe_x$ [Chemical Formula 1-1]

wherein x is about 1.1 to 1.36, y is about 0.1 to 4, and A is S, Te, N, P, As, Al, In, Zn, Cd, Mg, Mn, Ag, Au, or a combination thereof wherein the nanoparticle has a multishell structure, and wherein the nanocrystal of the compound represented by Chemical Formula 1 or Chemical Formula 1-1 is present as an interlayer between a Group III-V semiconductor nanocrystal and a Group II-VI semiconductor nanocrystal.

9. A process for synthesizing the nanocrystal of claim 1, the process comprising:
   contacting a first precursor containing gallium with a second precursor containing selenium to obtain a Ga—Se single precursor; and
   reacting the Ga—Se single precursor in a solvent in the presence of a ligand compound, and with a third precursor including an element other than gallium and selenium, to prepare the nanocrystal represented by Chemical Formula 1, or reacting the Ga—Se single precursor in a solvent in the presence of a ligand compound to prepare the nanocrystal represented by Chemical Formula 1-1:

$GaSe_xA_y$ [Chemical Formula 1]

$GaSe_x$ [Chemical Formula 1-1]

wherein A is S, Te, N, P, As, Al, In, Zn, Cd, Mg, Mn, Ag, Au, or a combination thereof, wherein x is about 1.1 to 3, and y is about 0.1 to 4, wherein the reacting the Ga—Se precursor comprises reacting the Ga—Se precursor in the presence of a first nanocrystal to form a shell of the Ga—Se nanocrystal on a surface of the first nanocrystal, and the first nanocrystal is a Group III-V semiconductor nanocrystal core, or is a core-shell semiconductor nanocrystal having a shell comprising a Group III-V semiconductor nanocrystal.

10. The process of claim 9, wherein the first precursor comprises a trialkyl gallium, gallium acetylacetonate, a gallium halide, a gallium oxide, a gallium alkoxide, or a combination thereof.

11. The process of claim 9, wherein the second precursor is a complex of selenium with a dialkylphosphine, a diarylphosphine, a trialkylphosphine, a trialkylphosphine oxide, or a combination thereof, a bis(trialkylsilyl)selenide, or a combination thereof.

12. The process of claim 9, wherein the solvent is a C6 to C22 primary alkyl amine, a C6 to C22 secondary alkyl amine, a C6 to C40 tertiary alkyl amine, a heterocyclic compound having a nitrogen atom, a C6 to C40 olefin, a C6 to C40 aliphatic hydrocarbon, an aromatic hydrocarbon substituted with a C6 to C30 alkyl group, a phosphine substituted with a C6 to C22 alkyl group, a phosphine oxide substituted with a C6 to C22 alkyl group, a C12 to C22 aromatic ether, or a combination thereof.

13. The process of claim 9, wherein the ligand compound is RCOOH, $RNH_2$, $R_2NH$, $R_3N$, RSH, $R_3PO$, $R_3P$, ROH, RCOOR', RCOOCOR', or a combination thereof, wherein R and R' are each independently a C1 to C24 alkyl group, a C2 to C24 alkenyl group, or a C5 to C24 aryl group.

14. The process of claim 9, wherein the element other than gallium and selenium of the third precursor is S, Te, N, P, As, Al, In, Zn, Cd, Mg, Mn, Cu, Ag, Au, or a combination thereof.

15. The process of claim 9, wherein an atomic ratio of Se with respect to Ga in the Ga—Se nanocrystal is at least about 1.2.

* * * * *